United States Patent
Hoffmann

(10) Patent No.: US 9,794,132 B2
(45) Date of Patent: Oct. 17, 2017

(54) TRGW AND VIRTUALISATION

(71) Applicant: NOKIA SOLUTIONS AND NETWORKS OY, Espoo (FI)

(72) Inventor: Klaus Hoffmann, Munich (DE)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 45 days.

(21) Appl. No.: 14/782,363

(22) PCT Filed: Apr. 3, 2013

(86) PCT No.: PCT/EP2013/057017
§ 371 (c)(1),
(2) Date: Oct. 5, 2015

(87) PCT Pub. No.: WO2014/161572
PCT Pub. Date: Oct. 9, 2014

(65) Prior Publication Data
US 2016/0072680 A1    Mar. 10, 2016

(51) Int. Cl.
H04L 12/24 (2006.01)
H04L 12/46 (2006.01)
H04L 29/06 (2006.01)

(52) U.S. Cl.
CPC ........ *H04L 41/145* (2013.01); *H04L 12/4633* (2013.01); *H04L 69/03* (2013.01)

(58) Field of Classification Search
None
See application file for complete search history.

(56) References Cited

U.S. PATENT DOCUMENTS 7,522,600 B1 * 4/2009 Aggarwal ............... H04L 12/18
                                                                370/256
2003/0076838 A1 * 4/2003 Shaio .................. H04L 12/5695
                                                                370/395.5

(Continued)

FOREIGN PATENT DOCUMENTS

WO    WO 2012/170016 A1    12/2012

OTHER PUBLICATIONS

International Search Report and Written Opinion dated Dec. 9, 2013 corresponding to International Patent Application No. PCT/EP2013/057017.

(Continued)

*Primary Examiner* — Min Jung
(74) *Attorney, Agent, or Firm* — Squire Patton Boggs (US) LLP

(57) ABSTRACT

A method and an apparatus are provided, by which control in a virtual network is performed, in which resources of a network are modeled, wherein the control of the virtual network is carried out according to a first network protocol. Moreover, a network interface is provided between the virtual network and the network the resources of which are modeled. A control part of a network resource is provided in the virtual network, the control part and the network resource requiring a second network protocol for exchanging control signaling. Control information according to one of the first and second network protocols, which are destined to the network element, is encapsulated in control signaling of another one of the first and second network protocols, and the control signaling is sent to the on the network interface to a network control element, which de-capsulates the encapsulated control information from the received control signaling, and forwards the detected control information to the network resource.

32 Claims, 6 Drawing Sheets

(56) References Cited

U.S. PATENT DOCUMENTS

| | | | | |
|---|---|---|---|---|
| 2004/0052257 | A1* | 3/2004 | Abdo | H04L 12/2602 370/392 |
| 2008/0195747 | A1* | 8/2008 | Elmaliah | H04L 29/06 709/232 |
| 2009/0016361 | A1* | 1/2009 | Serbest | H04L 45/50 370/399 |
| 2011/0142057 | A1* | 6/2011 | Deal | H04L 41/0806 370/401 |
| 2012/0087279 | A1* | 4/2012 | Rinne | H04L 12/2425 370/254 |
| 2012/0134358 | A1 | 5/2012 | Bellagamba et al. | |
| 2012/0177035 | A1* | 7/2012 | Sharma | G06F 13/4063 370/355 |
| 2012/0300615 | A1 | 11/2012 | Kempf et al. | |

OTHER PUBLICATIONS

3GPP TS 29.235 V11.0.0 (Sep. 2012), Technical Specification, 3rd Generation Partnership Project; Technical Specification Group Core Network and Terminals; Interworking between SIP-I Based Circuit-switched core network and other networks (Release 11), Sep. 2012, 105 pages.
3GPP TS 29.235 V11.1.0 (Dec. 2012), Technical Specification, 3rd Generation Partnership Project; Technical Specification Group Core Network and Terminals; Interworking between SIP-I Based Circuit-switched core network and other networks (Release 11), Dec. 2012, 105 pages.
Roland Bless et al., "Network Virtualization from a Signaling Perspective," Future-Net '09 International Workshop on the Network of the Future 2009 in conjunction with IEEE ICC 2009, Dresden, Jun. 16-18, 2009, 6 pages.
Panagiotis Papadimitriou et al., "Implementing Network Virtualization for a Future Internet," 20th ITC Specialist Seminar on Network Virtualization, Hoi An, Vietnam, May 2008, 8 pages.
Update on Split Architecture for Large Scale Wide Area Networks D3.2, Dec. 31, 2011 (Dec. 31, 2011), pp. 1-93, XP055070646; abstract figure 13, Section "3.2.4 Network virtualization techniques for OpenFlow" on pp. 27-31**Section "3.2.2 Requirements for the virtualization system" on p. 25-26*.
Rob Sherwood et al, "Flow Visor: A Network Virtualization Layer," OpenFlow, Openflow-TR-2009-1, Oct. 14, 2009, available at http://OpenFlowSwitch.org/downloads/technicalreports/openflow-tr-2009-1-flowvisor.pdf, 15 pages.
B. Rajagopalan, "Documentation of IANA Assignments for Label Distribution Protocol (LDP), Resource ReSerVation Protocol (RSVP), and Resource ReSerVation Protocol—Traffic Engineering (RSVP-TE) Extensions for Optical UNI Signaling," Network Working Group, RFC 3476, Mar. 2003, 10 pages.
S. Yasukawa, "Signaling Requirements for Point-to-Multipoint Traffic-Engineered MPLS Label Switched Paths (LSPs)" Network Working Group, RFC 4461, Apr. 2006, 26 pages.
A. Farrel et al., "A Path Computation Element (PCE)-Based Architecture," Network Working Group, RFC 4655, Aug. 2006, 35 pages.
J. Ash et al., "Path Computation Element (PCE) Communication Protocol Generic Requirements," Network Working Group, RFC 4657, Sep. 2006, 21 pages.
T. Li et al., "IS-IS Extensions for Traffic Engineering," Network Working Group, RFC 5305, Oct. 2008, 17 pages.
A. Doria et al., "Forwarding and Control Element Separation (ForCES) Protocol Specification," Internet Engineering Task Force (IETF), RFC 5810, Mar. 2010, 109 pages.

* cited by examiner

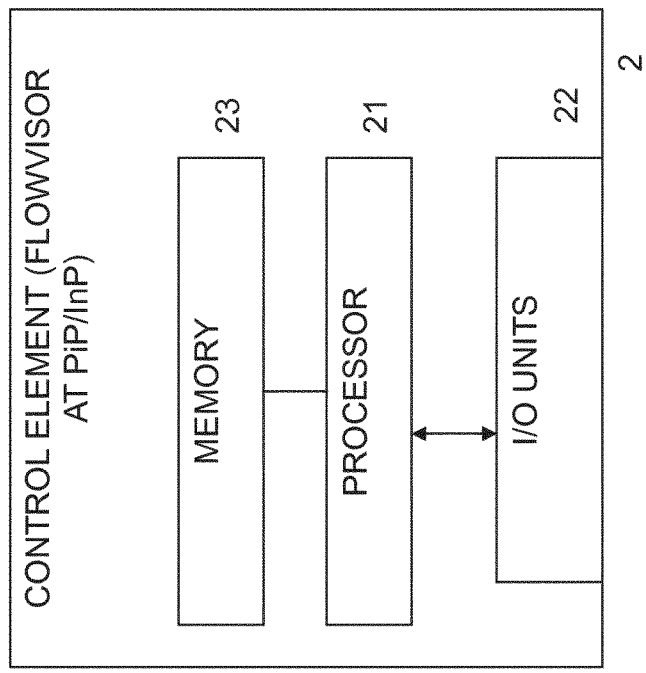
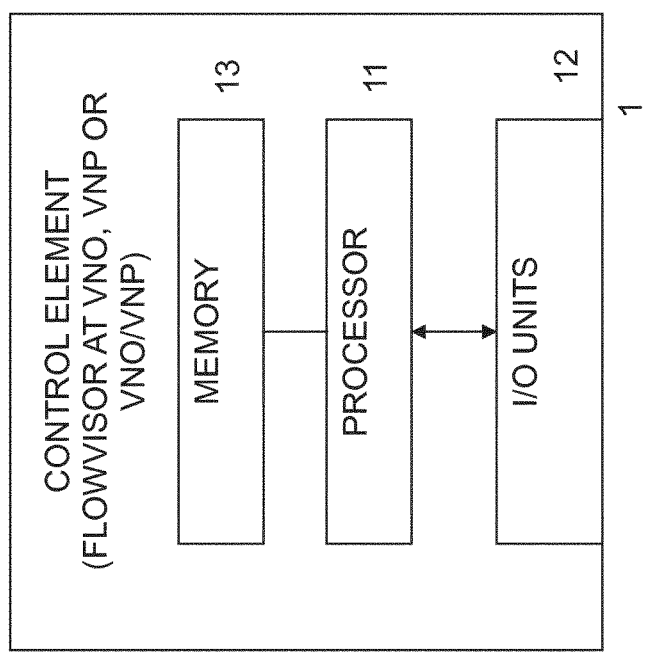
Fig. 6

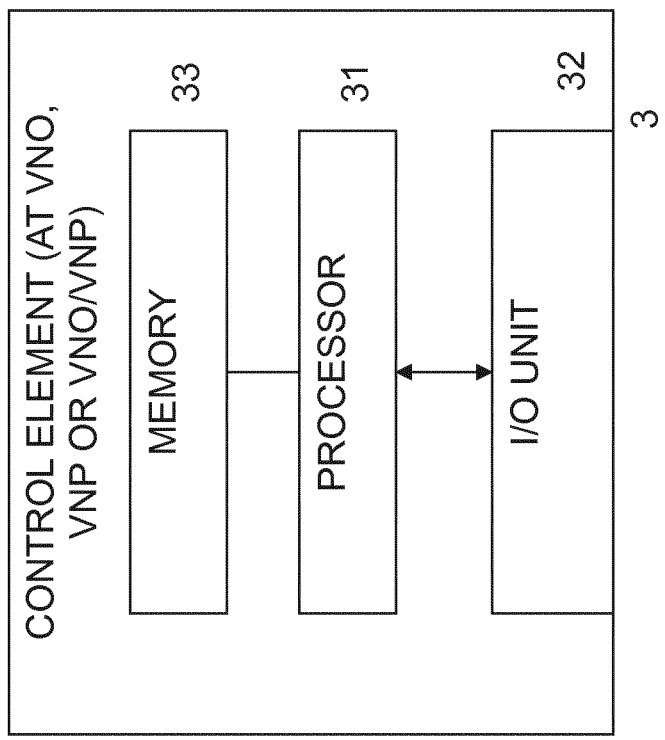

TRGW AND VIRTUALISATION

FIELD OF THE INVENTION

The present invention relates to network virtualization, in particular in connection with specific network elements such as, for example, a transition gateway (TrGW).

RELATED BACKGROUND ART

Prior art which is related to the technical field of network virtualization can e.g. be found in "Network Virtualization from a Signaling Perspective" by Roland Bless and Christoph Werle, Future-Net '09 International Workshop on the Network of the Future 2009 in conjunction with IEEE ICC 2009, Dresden, Jun. 16-18, 2009, "Implementing Network Virtualization for a Future Internet" by P. Papadimitriou, O. Maennel, A. Greenhalgh, A. Feldmann, and L. Mathy, 20th ITC Specialist Seminar on Network Virtualization, Hoi An, Vietnam, May 2008, as well as Request For Comments (RFC) Nos. 4461, 4655, 4657, 5305, 5810 issued by the IETF.

The following meanings for the abbreviations used in this specification apply:
BGW—Border Gateway
CS—circuit switched
CS-I BCF—CS (domain) IBCF
CS-TrGW—CS (domain) TrGW
Forces—forwarding and control element separation (IETF)
GLAB—German-LAB
IBCF—interconnection border control function
IP—Internet protocol
NE—network element
PCE—path computation element
P-CSCF—Proxy Call Session Control Function
PIP/InP—physical infrastructure provider/infrastructure provider
PSS—Packet-switched Streaming Service
QoS—quality of service
SASER—Save and Secure European routing
SIP—session initiation protocol
SPDF—Service Policy Decision Function
TrGW—transition gateway
VN—virtual network
VNO—virtual network operator
VNP—virtual network provider In the last years, an increasing extension of communication networks, e.g. of wire based communication networks, such as the Integrated Services Digital Network (ISDN), broadband networks, and especially the Internet and other packet based networks based e.g. on the Internet Protocol (IP), Ethernet, MPLS/GMPLS (Multiprotocol Label Switching/Generalized Multiprotocol Label Switching) or related technologies and preferably using optical transmission based on SDH/SONET (Synchronous Digital Hierarchy/ Synchronous Optical Networking) and/or WDM/DWDM (Wavelength Division Multiplexing/Dense Wavelength Division Multiplexing), or wireless communication networks, such as the cdma2000 (code division multiple access) system, cellular 3rd generation (3G) communication networks like the Universal Mobile Telecommunications System (UMTS), enhanced communication networks based e.g. on LTE, cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN) or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

Recent technology progress deals with network virtualization, which splits the conventional monolithically owned, used and operated networks into subsets to be used, operated and managed by different, organizationally independent control entities or organizations. Basically, network virtualization is a concept to create logical network resources, e.g. virtual nodes and virtual links, which form a virtual network, from physical resources.

The use of network virtualization promises additional flexibility and offers opportunities for deploying future network architectures. That is, network virtualization enables for the creation of logically isolated network partitions over a shared physical network infrastructure, wherein the network virtualization can be driven by the needs in, for example, an enterprise domain. Furthermore, network virtualization covers network elements and protocols that together maintain a coherent end-to-end view of a virtual network.

Basically, network virtualization is considered in 3 main sections:
  Network elements: how is traffic separation and isolation of different virtual networks maintained internal to a network element for the data part and the control part;
  Data path: how is traffic separation enforced across a network path;
  Control plane: what extensions to protocols are needed to control and manage partitioned resources (access to NEs and between NEs).

Considerations regarding network virtualization are made, for example, in connection with several projects, for example 4WARD (European-Union funded) and G-Lab (German national funded). Results of such projects introduced, for example, a separation into different roles regarding network virtualization, i.e. a Virtual Network Operator, VNO, role or level, a Virtual Network Provider, VNP, role or level, and a Physical Infrastructure Provider or just Infrastructure Provider, PIP/InP, role or level.

PIP/InP are infrastructure providers, e.g. large companies that own the infrastructure required to enable communication between different locations and which provide end users with access to their networks. Infrastructure providers may also enable the creation of virtual nodes and virtual links on top of and using their own physical resources and provide them to another party.

VNP is a provider which represents an intermediate party between a VNO and the infrastructure providers. The VNP is capable and equipped, for example, to compose and provide a virtual network slice as requested by a VNO from physical resources of one or more infrastructure providers. The VNO, on the other hand, can install and instantiate a network architecture using the virtual network slice and properly configure it. After the virtual network has been set up, end users may attach to it and use the service it provides. A VNO may provide a service in the virtual network by itself or allow other service providers to offer their services, e.g., an IP-TV service, inside the virtual network.

That is, the VNP is supposed to request and collect virtual resources from a PIP/InP, and to form a whole virtualized network on behalf of a VNO, which in turn operates this virtual network. In that way, the physical resources of a PIP/InP are separated and transformed into virtual resources provided to and managed by a VNP, and configured to form virtual networks finally handed over to VNOs for operation and use. In that way also the control of such virtual resources, even if implemented as shares of the same physical entities, is completely handed over to the virtual network operator using it.

Thus, with the event of network and IT virtualization, existing architectures are challenged. As such the Hypervisors are known, also Flowvisor is known, see OpenFlow (e.g., https://www.opennetworking.org/) etc. In this connection, it is referred to document "FlowVisor: A Network Virtualization Layer" by Rob Sherwood, Glen Gibb, Kok-Kiong Yap, Guido Appenzeller, Martin Casado, Nick McKeown and Guru Parulkar, Oct. 14, 2009 (http://OpenFlow-Switch.org/downloads/technicalreports/openflow-tr-2009-1-flowvisor.pdf), and also to RFC3476 and RFC5810.

New architectures require new interfaces and/or procedures to support existing/expected services. However, for some cases it is difficult to incorporate existing network elements into the network virtualization, for example in a case in which it can be expected that those network elements will soon be taken out of use, or in a case in which the network operator does not wish to reveal their functions to a virtual network provider (VNP).

For example, this could apply for the CS-IBCF and the CS-TrGW. These elements will probably be disruptively replaced in the future.

FIG. 1, which reproduces Fig. A.7.1.1.1 of 3GPP TS 29.235 V11.1.0 (2012-12) shows a corresponding network model involving the above-mentioned network elements. The broken line, i.e., the line connecting the CS-IBCF with the external network and the 3GPP PLMN, represents the call control signalling. The dotted line, i.e., the line connecting the TrGW with the external network and the 3GPP PLMN, represents the bearer control signalling (if applicable) and the user plane. The CS-IBCF uses one context with two terminations in the TrGW. The termination T1 is used towards the 3GPP PLMN and the bearer termination T2 is used for the bearer towards the external IP network.

As also derivable from the above, the procedures according to 3GPP consider separation of the control and data plane, but do not consider the virtualisation yet.

SUMMARY OF THE INVENTION

Embodiments of the present invention address this situation and aim to overcome the above-described problem and to provide a method, apparatus, and computer program product by means of which specific network elements such as those described above can be incorporated into a virtual network.

According to a first aspect of the present invention, a method for performing control in a virtual network is provided in which resources of a network are modeled, wherein
  control of the virtual network is carried out according to a first network protocol,
  a network interface is provided between the virtual network and the network the resources of which are modeled,
  a control part of a network resource is provided in the virtual network, the control part and the network resource requiring a second network protocol for exchanging control signaling,
  the method comprising
  encapsulating control information according to one of the first and second network protocols in control signaling of another one of the first and second network protocols and sending the control signaling on the network interface.

According to a second aspect of the present invention, a method for controlling a network resource according to a virtual network is provided in which resources of a network are modeled, wherein
  a network interface is configured to provide a connection to the virtual network, and
  a control part of the network resource is provided in the virtual network, the control part and the network resource requiring a second network protocol for exchanging control signaling,
  the method comprising
  de-capsulating control information according to one of the first and second network protocols from control signaling according to another one of the first and second network protocols on the network interface, and
  forwarding the de-capsulated control information to the network resource.

According to a third aspect of the present invention, an apparatus is provided which comprises
  a memory,
  at least one network interface, and
  a processor configured to perform control in a virtual network in which resources of a network are modeled, wherein control of the virtual network is carried out according to a first network protocol,
  the network interface is provided between the virtual network and the network, the resources of which are modeled,
  a control part of a network resource is provided in the virtual network, the control part and the network resource requiring a second network protocol for exchanging control signaling, and
  the processor is further configured to
  encapsulate control information according to one of the first and second network protocols in control signaling of another one of the first and second network protocols and send the control signaling on the network interface.

According to a fourth aspect of the present invention, an apparatus is provided which comprises
  a memory,
  at least one network interface, and
  a processor configured to control a network resource according to a virtual network in which resources of a network are modeled, wherein
  the network interface is configured to provide a connection to the virtual network, and
  a control part of the network resource is provided in the virtual network, the control part and the network resource requiring a second network protocol for exchanging control signaling,
  wherein the processor is further configured
  to de-capsulate control information according to one of the first and second network protocols from control signaling according to another one of the first and second network protocols on the network interface, and
  to forward the de-capsulated control information to the network resource.

Modifications of the first to fourth aspects are defined in the dependent claims.

Moreover, according to a fifth aspect of the present invention, a computer program product is provided which comprises code means for performing a method according to any one of the first and second aspects and their modifications when run on a processing means or module. The computer program product may be embodied on a computer-readable medium.

BRIEF DESCRIPTION OF THE DRAWINGS

These and other objects, features, details and advantages will become more fully apparent from the following detailed description of embodiments of the present invention which is to be taken in conjunction with the appended drawings, in which:

FIG. 6 shows a block circuit diagram illustrating configurations of control elements in which examples of embodiments of the invention are implementable, and FIG. 7 shows a block circuit diagram illustrating a configuration of a control element such as an IBCF according to a further embodiment of the present invention.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

Figure 1:
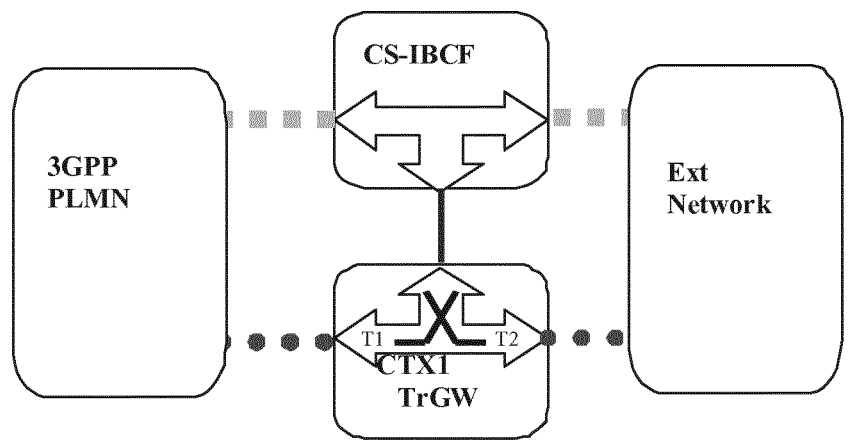
FIG. 1 shows an arrangement of the H.248 context model in connection with a CS-IBCF and a TrGW.

When virtualizing a network structure including the structure of the CS-IBCF and the TrGW shown in FIG. 1, it can be expected that the PIP creates a control instance policing the requests from the VNO/VNP (in the GLAB/SASER architecture the VNP is separated from the VNO and the PIP). It is noted that the invention is applicable to a case in which the VNO and the VNP are combined, but also to the separated case, in which VNO and VNP are separated. However, it is not mandatory necessary that the VNP is separated, and it may be part of the VNO or even the PIP. According to embodiments of the present invention, this instance is augmented with new functionality by intercepting the H.248 interface and encapsulating it into the OpenFlow/Forces protocol as described in the following.

Figure 2:
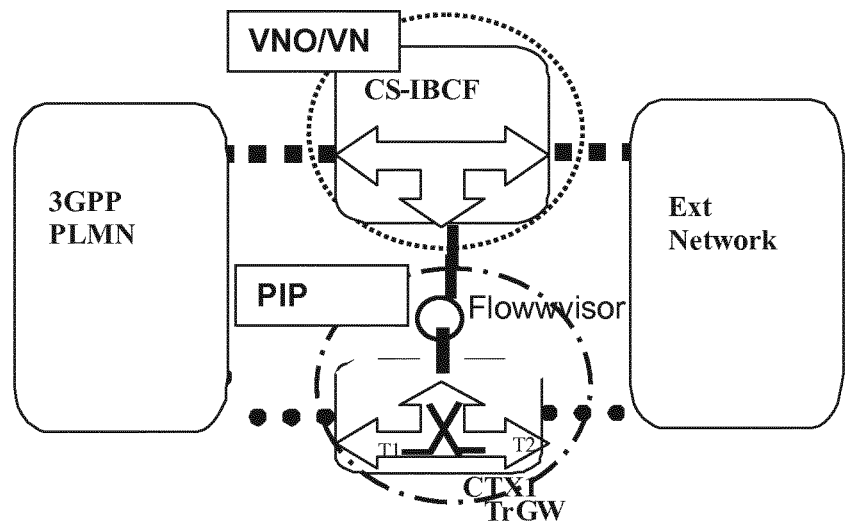
FIG. 2 shows an arrangement of a CS-IBCF and a TrGW similar to FIG. 1, in a virtual network, where VNO/VNP collapsed together, according to an embodiment of the present invention.

In particular, as shown in the example of FIG. 2, the CS-IBCF is located in the VNO or VNP, and the TrGW, which is the actual physical network resource in this case, is located in the PiP (or InP). In a conventional network structure, the control signaling between the CS-IBCF and the TrGW is exchanged using the H.248 protocol, i.e., is conveyed via a H.248 interface. That is, according to the arrangement as shown in FIG. 2, the physical hardware needs to host two different interfaces e.g. H.248 and Open Flow/Forces.

In practice, however, any VNO may wish to keep its virtualized IBCF (or whatever virtualized IMS server, like e.g. P-CSCF etc) as unmodified as much as possible in the virtualized network environment to keep/save the investment for IBCF (etc) as much as possible (reuse the existing call processing software, either own or bought from vendors. (The vendors interest may be different, however even the vendor may wish to reuse as much as possible as well).

In general, a TrGW consists of a simple routing machine and an application layer part, here controlled by a SIP application. Within the virtualization environment where the PIP offers their sellable goods to the VNPs, and which in turn may broker them (the virtualized resources) to the VNOs, the VNO is in general capable to configure the network via Forces (and/or Open Flow).

Therefore it is beneficial if the H.248 Interface is "piggy backed" on the Forces (and/or OpenFlow), i.e., that the control signaling which would be conveyed on the H.248 interface is encapsulated on the Forces interface. In the long run there is no need to have two interfaces (one for H.248 and one for Forces and/or OpenFlow).

Figure 3:
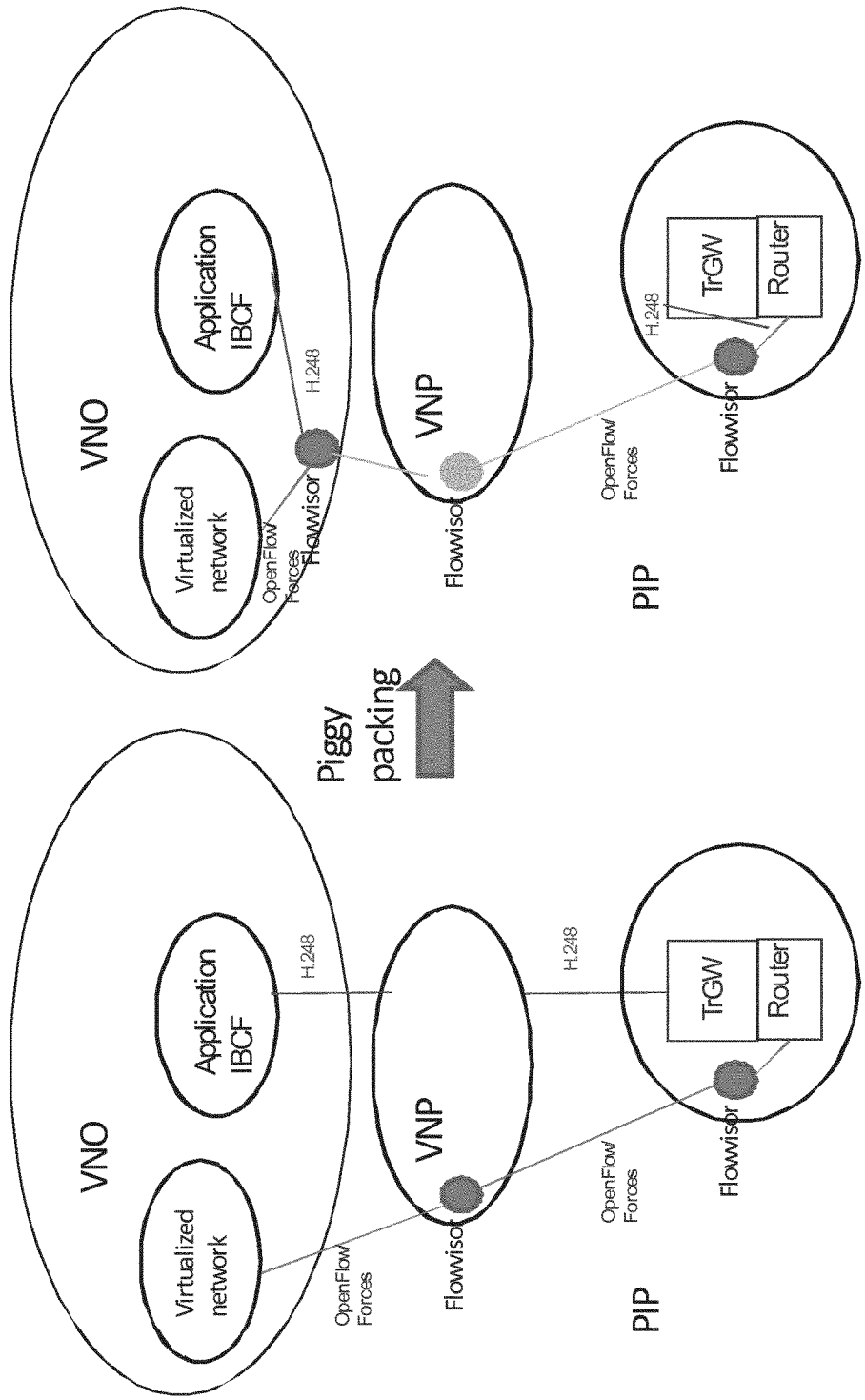
FIG. 3A illustrates an arrangement of a IBCF and a TrGW in a virtual network with two interfaces.
FIG. 3B shows this arrangement with a single arrangement according to an embodiment of the present invention.

This is illustrated in FIGS. 3A and 3B. FIG. 3A shows an approach in which a separate H.248 interface is provided. This interface has to be established between VNO and VNP, and between VNP and the PIP towards the TrGW. Thus, in such a scenario it would be necessary that the VNP is capable of providing this interface, and, thus the VNP has to know the corresponding functions and control signaling exchanged between the IBCF and the TrGW. The remaining network is fully virtualized so that control can be performed by OpenFlow/Forces by means of Flowvisor provided in VNP and PiP.

FIG. 3B shows the approach according to an embodiment of the present invention. In particular, as mentioned above, the H.248 interface is "piggybacked" on the OpenFlow/Forces interface.

In conventional virtualized networks only the switch/router functionality is considered yet. See OpenFlow interface specification. However the IBCF application from the IMS considered within this invention is introduced via the following procedure.

In embodiment 1 the IBCF application, which is currently configured to interface with the TrGW directly via the H.248, see FIG. 1, is to be configured such that the H.248 interface is connected with the Flowvisor. That Flowvisor may be part of the VNO or may be part of the VNP.

The FlowVisor (either within the VNO or the VNP or the PIP) receives the message from the IBCF and incorporates the whole message into a container either into an already built OpenFLow message intended to be sent, because already at hand due to a the need of the virtualized network controller on the left of the FIG. 3B to the underlying Flowvisor or OpenFlow Switch, or the FlowVisor builds an extra new OpenFlow message just on purpose due to the receipt of the H.248 message from the IBCF and sends it to the underlying Flowvisor/Openflowswitch.

Finally the receiving Flowvisor/OpenFlow switch extracts the piggybacked H.248 message and delivers it e.g to the TrGW application as depicted in FIG. 3b. If the carrier OpenFlow message also carries Virtualized network information elements and, these information is delivered to the conventional router/openflow switch function.

The Flowvisors or the corresponding control elements shown in FIG. 3B are illustrated in some more detail in FIG.

Figure 4:
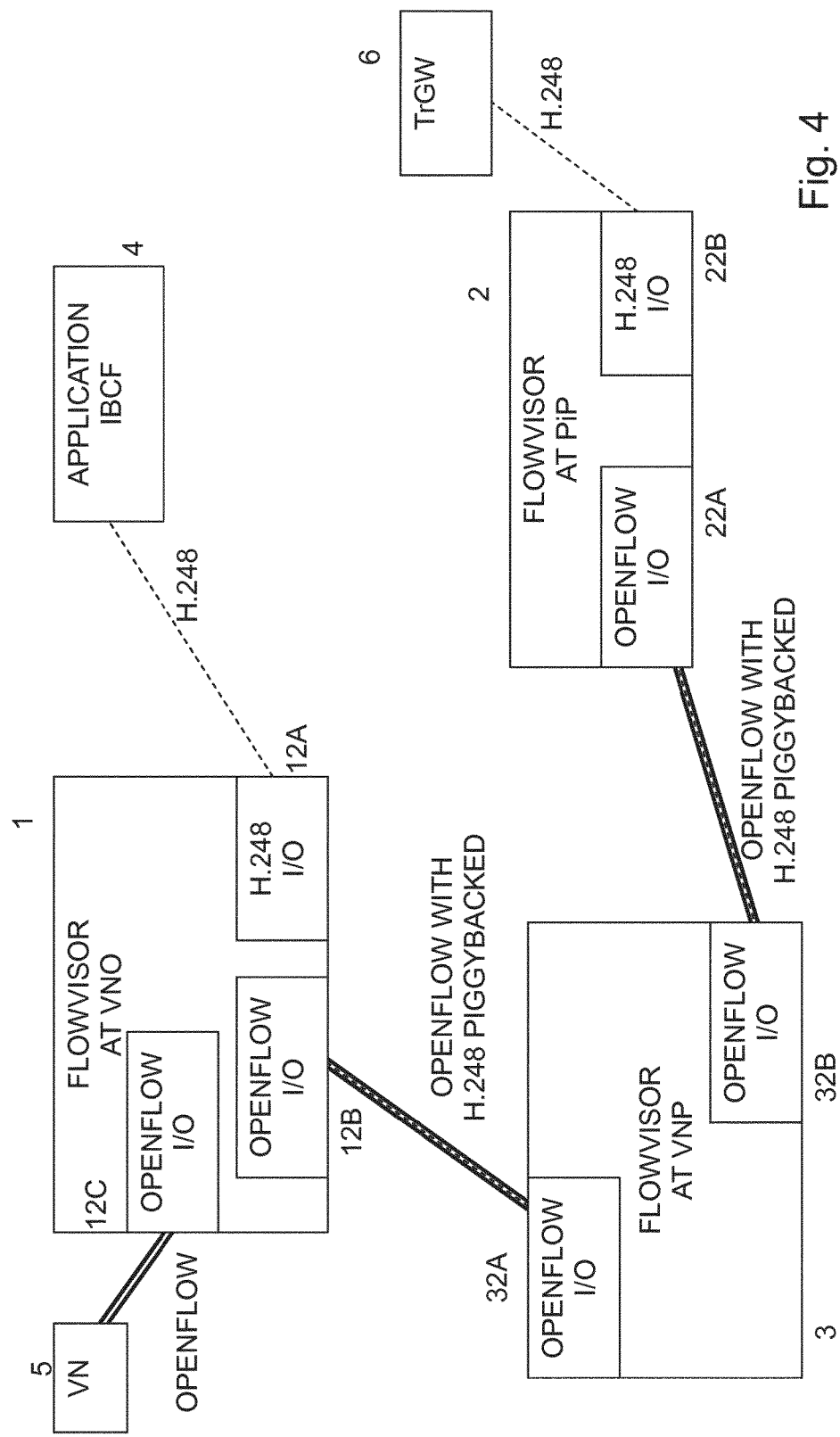
FIG. 4 shows Flowvisors shown in FIG. 3B in some more detail.

4. In particular, FIG. 4 shows a Flowvisor 1 which is located at the VNO level, a Flowvisor 2 which is located on the PiP level and a Flowvisor 3 which is located on the VNP level. The Flowvisor 1 comprises three interfaces (I/O units) 12A to 12C. The I/O unit 12A is a H.248 I/O unit which receives H.248 control signaling from an application IBCF 4. The I/O unit 12C receives OpenFlow (or Forces or another suitable virtual network protocol) control signaling from a virtualized network 5. As mentioned above, the Flowvisor 1 piggybacks or encapsulates the H.248 control signaling from the application IBCF 4 into the OpenFlow signaling. The thus piggybacked control signaling is sent from the OpenFlow I/O unit 12B to the Flowvisor 3 at the VNP.

The Flowvisor 3 comprises two I/O units 32A and 32B, which are both OpenFlow I/O units. That is, the Flowvisor 3 forwards the piggybacked OpenFlow control signaling received from the I/O unit 12B of the Flowvisor 1 to the Flowvisor 2 at PiP level via the I/O unit 32B. The Flowvisor 2 at PiP comprises an OpenFlow I/O unit 22A and a H.248 I/O unit 22B. The I/O unit 22A receives the piggybacked control signaling from the Flowvisor 3. The Flowvisor 2 de-capsulates the H.248 control signaling from the received OpenFlow control signaling, and sends the H.248 control signaling to the TrGW 6. Furthermore the Flowvisor at PIP forward the conventional OpenFlow information to the router/switch.

It is noted that all Flowvisors may have more I/O units as indicated above. For example, the Flowvisor 2 at PiP level may have one or more further OpenFlow I/O units by which corresponding control signaling may be forwarded to other elements, e.g., the router shown in FIG. 3B.

The same approach can also be applied to the 3GPP inter IMS scenario for the SPDF and the BGW.

Figure 5:
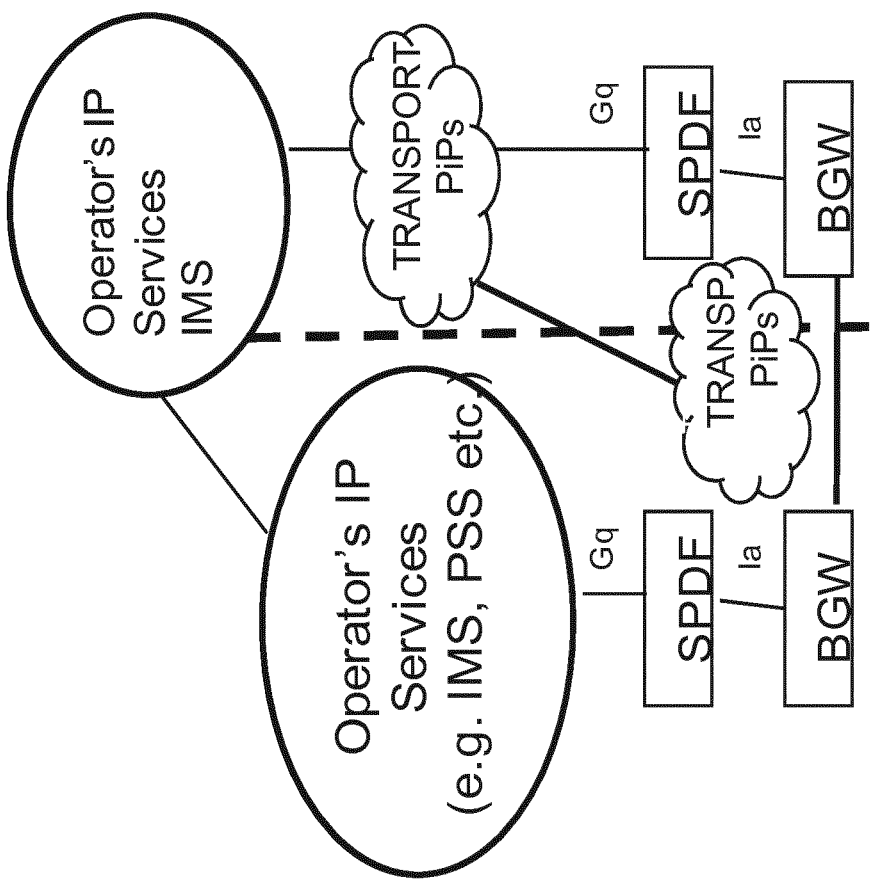
FIG. 5 shows an alternative embodiment of the present invention in which a Gq interface is encapsulated via the Forces/Open Flow interface.

This is illustrated in FIG. 5, in which there is the Gq Interface and/or the Ia is to be piggybacked similarly via the Forces/OpenFlow interface.

In addition to the CS-I BCF and TrGW functionality also for Inter IMS Operator services the same approach can be applied such that the BGW can be seen to be a special kind of TrGW, which is controlled by an IMS
IBCF via the intermediate SPDF.

Similar to the CS-I BCF the IMS IBCF sends a Gq (Diameter) message, but instead of to a H248 message, to the configured underlying Flowvisor, which piggybacks this towards the SPDF. The Flowvisor attached to the SPDF may de-capsulate the Gq message from the OpenFlow message and delivers them to the SPDF an dthe underlying router functionality respectively. The SPDF in turn maps the Gq message to the Ia message and forwards this to the underlying FlowVisor which encapsulates the Ia interface on the OpenFlow message and forwards it to the BGW, which in turn acts similar to the procedure for the TrGW.

Thus, according to the embodiments described above in connection with FIGS. 2 to 4, it is possible to maintain only one interface which simply carries additionally the H.248/Gq/Rx/etc interface in a container in the OpenFlow or forces interface.

As an alternative, it would be also possible to change the arrangement such that the H.248 protocol carries the OpenFlow/Forces protocol.

As a further alternative, it is also possible to map dedicated/explicit contents of (existent) individual information elements (I.E.) of the H.248 protocol to the OpenFow/Forces information elements where appropriate.

Instead of setting up a container which tunnels the H.248 messages one maps the single and individual dedicated H.248 information elements into corresponding existent or newly defined OpenFlow information elements.

But this has the drawback that possible intermediate network element need to understand both details of the corresponding two protocols both the carrier and the carried protocol.

E.g. a parameter xxx (with its content) of the H.248 protocol would be explicitly mapped to a parameter yyy (with its content) of the OpenFlow message.

It is possible that the OpenFLow is piggybacked on top of the H.248 or Ia, Diameter or Rx etc.

The above example are simply examples and are in general available for other applications.

In the following, a general embodiment of the present invention is described by referring to FIG. 6. In particular, FIG. 6 shows several control elements involved in procedures according to embodiments of the present invention. In more detail, FIG. 6 shows a control element 1 (e.g., the Flowvisor at VNO 1 shown in FIG. 4) on the VNO (or VNP) level, and a control element 2 (e.g., the Flowvisor at PiP 2 shown in FIG. 4) on the PiP (or InP) side.

Although in FIGS. 4 and 6 the control element 1 is shown to be on the VNO level, the control element 1 may alternatively be on the VNP level, when VNO and VNP are separated, or can be on the VNO/VNP level when VNO and VNP are combined. Further alternatively, the control element 1 may also be on the PiP (or InP) level. That is, the piggybacking, i.e., encapsulating, may be carried out on any level.

It is to be noted that the control elements 1 and 2 shown in FIG. 6 may comprise several further elements or functions besides those described in connection therewith but which are omitted herein for the sake of simplicity as they are not essential for understanding the invention.

As shown in FIG. 6, the control element 1 comprises a processing function or processor 11, such as a CPU or the like, which executes instructions given by programs or the like. The processor 11 may comprise further portions dedicated to specific processings as described below. Portions for executing such specific processings may be also provided as discrete elements or within one or more further processors, for example. Reference sign 12 denotes transceivers or input/output (I/O) units connected to the processor 11. For example, the I/O units 12 may comprise the H.248 I/O unit 12A and the OpenFlow I/O units 12B and 12C shown in FIG. 4. The I/O units 12 may be used for communicating with other network elements or functions, such as other hierarchical levels like the PIP/InP level or the VNP level. In this example, I/O unit 12A serves to communicate with an IBCF (as an example for a control part of a network resource) via the H.248 protocol, and I/O unit serves to communicate with, e.g., other FlowVisors located in VNP or PiP or the like via OpenFlow. Reference sign 13 denotes a memory usable, for example, for storing data and programs to be executed by the processor 11 and/or as a working storage of the processor 11.

The processor 11 is configured to perform control in a virtual network in which resources of a physical or virtual network provided by at least one physical infrastructure provider are modeled, wherein control of the virtual network is carried out according to a first network protocol, the network interface is provided between the virtual network and the at least one physical infrastructure provider, and a control part (e.g., an IBCF) of a network resource (e.g., TrGW) is provided in the virtual network, the control part and the network resource requiring a second network protocol (e.g., H.248, MGCP, Ia, Gq, Rx, Diameter etc.) for exchanging control signaling. The processor 11 is further configured to encapsulate control information according to one of the first and second network protocols in control signaling of another one of the first and second network protocols and sending the control signaling on the network interface.

Similar as the control element 1, the control element 2 comprises a processing function or processor 21, such as a CPU or the like, which executes instructions given by programs or the like. The processor 21 may comprise further portions dedicated to specific processings as described below. Portions for executing such specific processings may be also provided as discrete elements or within one or more further processors, for example. Reference sign 22 denotes transceivers or input/output (I/O) units connected to the processor 21. The I/O units 22 may be used for communicating with other network elements (e.g., the TrGW mentioned above) or functions, such as other hierarchical levels like the PIP/InP level or the VNP level. Reference sign 23 denotes a memory usable, for example, for storing data and programs to be executed by the processor 21 and/or as a working storage of the processor 21.

The processor 21 is configured to control a network resource according to a virtual network in which resources of a physical or virtual network are modeled, wherein the network interface is configured to provide a connection to the virtual network, and a control part of the network resource is provided in the virtual network, the control part and the network resource requiring a second network protocol for exchanging control signaling. The processor 21 is further configured to de-capsulate control information according to one of the first and second network protocols from control signaling according to another one of the first and second network protocols on the network interface, and to forward the detected control information to the network resource.

Thus, according to embodiments of the present invention, control signaling of one network protocol is encapsulated (piggybacked) into another control signaling of another network protocol.

In the following, another embodiment is described by referring to FIG. 7. According to this embodiment, the Application IBCF may be additional provisioned with a plugin which is applied such that the IBCF itself already piggy backs the H.248 on top of a OpenFLow/ForCEs protocol, before the H. 248 messages are sent to the to be configured Flowvisor. In the following.

FIG. 7 shows an IBCF 3 as a corresponding example for a control element configured to carry out an IBCF. In the following, the main differences to the embodiment illustrated in FIG. 6 are described. Similar as the control element 1, the IBCF 3 comprises a processing function or processor 31 such as a CPU or the like. Reference sign 22 denotes transceivers or input/output (I/O) units connected to the processor 11. In contrast to the control element 1, no specific H.248 I/O unit is provided, since the processor directly encapsulates the H.248 protocol into the OpenFlow protocol (e.g., by using a plugin, as mentioned above). Reference sign 33 denotes a memory usable, for example, for storing data and programs to be executed by the processor 31 and/or as a working storage of the processor 31.

It is noted that the embodiments and the present invention in general is not limited to the specific examples given above.

For example, in the embodiments, mainly H.248 was described as an example for the second network protocol. However, other protocols are also possible, for example MGCP, Ia, Gq, Rx, Diameter.

Moreover, some embodiments of the present invention were described by referring to a TrGW as an example for a network resource. However, also other kinds of network resources are possible. The network resource is also not limited to a physical network resource, but may also be a virtual network resource.

Hence, the network resource may be a physical network resource in a physical network or a virtual network resource in a virtual network. The network, the resources of which are modeled, may be a physical network or a virtual network, wherein the virtual network may be different from that virtual network in which control is carried out by the above-described control elements.

Hence, according to embodiments of the present invention, methods and apparatuses are provided, by which control in a virtual network is performed, in which resources of a network are modeled, wherein the control of the virtual network is carried out according to a first network protocol. Moreover, a network interface is provided between the virtual network and the network the resources of which are modeled. A control part of a network resource is provided in the virtual network, the control part and the network resource requiring a second network protocol for exchanging control signaling. Control information according to one of the first and second network protocols, which are destined to the network element, is encapsulated in control signaling of another one of the first and second network protocols, and the control signaling is sent to the on the network interface to a network control element, which de-capsulates the encapsulated control information from the received control signaling, and forwards the detected control information to the network resource.

According to another aspect of embodiments of the present invention, an apparatus is provided which comprises means for performing control in a virtual network in which resources of a network are modeled, wherein control of the virtual network is carried out according to a first network protocol, interface means for providing a connection between the virtual network and the network, the resources of which are modeled, wherein a control part of a network resource is provided in the virtual network, the control part and the network resource requiring a second network protocol for exchanging control signaling, and the apparatus further comprising means for encapsulating control information according to one of the first and second network protocols in control signaling of another one of the first and second network protocols and sending the control signaling on the interface means.

According to further aspect of embodiments of the present invention, an apparatus is provided which comprises means for controlling a network resource according to a virtual network in which resources of a network are modeled, interface means for providing a connection to the virtual network, wherein a control part of the network resource is provided in the virtual network, the control part and the network resource requiring a second network protocol for exchanging control signaling, the apparatus further comprising means for de-capsulating control information according to one of the first and second network protocols from control signaling according to another one of the first and second network protocols on the interface means, and means for forwarding the de-capsulated control information to the network resource.

It is to be understood that any of the above modifications can be applied singly or in combination to the respective aspects and/or embodiments to which they refer, unless they are explicitly stated as excluding alternatives.

For the purpose of the present invention as described herein above, it should be noted that an access technology via which signaling is transferred to and from a network element may be any technology by means of which a network element or sensor node can access another network element or node (e.g. via a base station or generally an access node). Any present or future technology, such as WLAN (Wireless Local Access Network), WiMAX (Worldwide Interoperability for Microwave Access), LTE, LTE-A, Bluetooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable communication networks, stations and transmission nodes may be or comprise any device, apparatus, unit or means by which a station, entity or other user equipment may connect to and/or utilize services offered by the access network; such services include, among others, data and/or (audio-) visual communication, data download etc.;

a user equipment or communication network element (station) may be any device, apparatus, unit or means by which a system user or subscriber may experience services from an access network, such as a mobile phone or smart phone, a tablet, a personal digital assistant PDA, or computer, or a device having a corresponding functionality, such as a modem chipset, a chip, a module etc., which can also be part of a UE or attached as a separate element to a UE, or the like;

method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above, eNode-B etc. as described above are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

The invention claimed is:

1. A method for controlling a virtual network in which resources of a network are modeled, wherein
   the controlling of the virtual network is carried out according to a virtual network protocol;
   a network interface is provided between the virtual network and the network the resources of which are modeled; and
   a control part relating to a network resource is provided in the virtual network, the control part relating to the network resource and the network resource requiring a second network protocol for exchanging control signaling,
   the method comprising:
   encapsulating control information according to the second network protocol in control signaling according to the virtual network protocol; and
   sending the control signaling according to the virtual network protocol including the encapsulated control information according to the second network protocol over the network interface.

2. The method according to claim 1, wherein the control information according to the second network protocol is control signaling according to the second network protocol, and the method further comprises:
   intercepting the control signaling according to the second network protocol in the virtual network.

3. The method according to claim 2, wherein intercepting the control signaling according to the second network protocol is performed by detecting the control signaling according to the second network protocol, wherein the control signaling according to the second network protocol is known due to network configuration.

4. The method according to claim 2, wherein encapsulating the control signaling according to the second network protocol is performed by inserting the control signaling according to the second network protocol into control signaling according to the virtual network protocol.

5. The method according to claim 1, wherein encapsulating the control information according to the second network protocol is performed by inserting the control information according to the second network protocol in an information field according to the virtual network protocol.

6. The method according to claim 1, wherein the virtual network is operated by a virtual network operator and provided by a virtual network provider, and the network, the resources of which are modeled, is a physical network provided by at least one physical infrastructure provider, and
wherein the virtual network operator and the virtual network provider are a combined entity, or
the virtual network provider and the physical infrastructure provider are a combined entity, or
the virtual network operator and the virtual network provider are separated entities.

7. The method according to claim 1, wherein the network, the resources of which are modeled, is another virtual network.

8. The method according to claim 1, wherein the method is carried out by a network control element on a virtual network operator level, a virtual network provider level or a physical infrastructure provider level.

9. The method according to claim 8, wherein a second network interface according to the second network protocol is provided between the network control element carrying out the method and the control part relating to the network resource.

10. The method according to claim 1, wherein the method is carried out by the control part relating to the network resource.

11. A method for controlling a network resource of a virtual network in which resources of a network are modeled, wherein
control of the virtual network is carried out according to a virtual network protocol;
a network interface is configured to provide a connection between the network the resources of which are modeled and the virtual network; and
a control part relating to the network resource is provided in the virtual network, the control part relating to the network resource and the network resource requiring a second network protocol for exchanging control signaling;
the method comprising:
receiving control signaling according to the virtual network protocol over the network interface;
de-capsulating control information according to the second network protocol from the control signaling according to virtual network protocol; and
forwarding the de-capsulated control information to the network resource.

12. The method according to claim 11, wherein the control information according to the second network protocol is control signaling according to the second network protocol.

13. The method according to claim 11, wherein de-capsulating the control information is performed by extracting the control information according to the second network protocol from an information field according to the virtual network protocol.

14. The method according to claim 11, wherein the virtual network is operated by a virtual network operator and provided by a virtual network provider, and the network, the resources of which are modeled, is a physical network provided by at least one physical infrastructure provider, and
wherein the virtual network operator and the virtual network provider are a combined entity, or
the virtual network provider and the physical infrastructure provider are a combined entity, or
the virtual network operator and the virtual network provider are separated entities.

15. The method according to claim 11, wherein the network, the resources of which are modeled, is another virtual network.

16. An apparatus comprising
at least one processor, and
at least one memory including computer program code,
wherein the at least one memory and the computer program code are configured to, with the at least one processor, cause the apparatus to at least:
control a virtual network in which resources of a network are modeled, wherein
control of the virtual network is carried out according to a virtual network protocol;
a network interface is provided between the virtual network and the network the resources of which are modeled; and
a control part relating to a network resource is provided in the virtual network, the control part relating to the network resource and the network resource requiring a second network protocol for exchanging control signaling,
and;
encapsulate control information according to the second network protocol in control signaling of the virtual network protocol; and
send the control signaling of the virtual network protocol including the encapsulated control information according to the second network protocol over the network interface.

17. The apparatus according to claim 16, wherein the control information according to the second network protocol is control signaling according to the second network protocol, and
the at least one memory and the computer program code are further configured, with the at least one processor, to:
intercept the control signaling according to the second network protocol in the virtual network.

18. The apparatus according to claim 17, wherein the at least one memory and the computer program code are further configured, with the at least one processor, to intercept the control signaling according to the second network protocol by detecting the control signaling according to the second network protocol, wherein the control signaling according to the second network protocol is known due to network configuration.

19. The apparatus according to claim 17, wherein the at least one memory and the computer program code are further configured, with the at least one processor, to encapsulate the control signaling according to the second network protocol by inserting the control signaling according to the second network protocol into control signaling according to the virtual network protocol.

20. The apparatus according to claim 16, wherein the at least one memory and the computer program code are further configured, with the at least one processor, to encapsulate the control information according to the second network protocol by inserting the control information according to the second network protocol in an information field according to the virtual network protocol.

21. The apparatus according to claim 16, wherein the virtual network is operated by a virtual network operator and provided by a virtual network provider, and the network, the resources of which are modeled, is a physical network provided by at least one physical infrastructure provider, and
wherein the virtual network operator and the virtual network provider are a combined entity, or
the virtual network provider and the physical infrastructure provider are a combined entity, or
the virtual network operator and the virtual network provider are separated entities.

22. The apparatus according to claim 16, wherein the network, the resources of which are modeled, is another virtual network.

23. The apparatus according to claim 16, wherein the apparatus is a network control element on a virtual network operator level, a virtual network provider level or a physical infrastructure provider level.

24. The apparatus according to claim 16, further comprising a second network interface according to the second network protocol with the control part relating to the network resource.

25. The apparatus according to claim 16, wherein the apparatus comprises the control part relating to the network resource.

26. An apparatus comprising
at least one processor; and
at least one memory including computer program code,
the at least one memory and the computer program code configured, with the at least one processor, to cause the apparatus at least to
control a network resource of a virtual network in which resources of a network are modeled, wherein
control of the virtual network is carried out according to a virtual network protocol;
the network interface is configured to provide a connection between the network the resources of which are modeled and the virtual network; and
a control part relating to the network resource is provided in the virtual network, the control part relating to the network resource and the network resource requiring a second network protocol for exchanging control signaling;
and to:
receive control signaling according to the virtual network protocol over the network interface;
de-capsulate control information according to the second network protocol from the control signaling according to the virtual network protocol; and
forward the de-capsulated control information according to the second network protocol to the network resource.

27. The apparatus according to claim 26, wherein the control information according to the second network protocol is control signaling according to the second network protocol.

28. The apparatus according to claim 26, wherein the at least one memory and the computer program code are further configured, with the at least one processor, to cause the apparatus to de-capsulate the control information according to the second network protocol by extracting the control information according to the second network protocol from an information field according to the virtual network protocol.

29. The apparatus according to claim 26, wherein the virtual network is operated by a virtual network operator and provided by a virtual network provider, and the network, the resources of which are modeled, is a physical network provided by at least one physical infrastructure provider, and
wherein the virtual network operator and the virtual network provider are a combined entity, or
the virtual network provider and the physical infrastructure provider are a combined entity, or
the virtual network operator and the virtual network provider are separated entities.

30. The apparatus according to claim 26, wherein the network, the resources of which are modeled, is another virtual network.

31. A computer program product embodied on a non-transitory computer-readable medium, said product comprising code that performs a method according to claim 1 when run on a processor.

32. A computer program product embodied on a non-transitory computer-readable medium, said product comprising code that performs a method according to claim 11, when run on a processor.

* * * * *